United States Patent
Ishibashi

(10) Patent No.: US 7,044,567 B2
(45) Date of Patent: May 16, 2006

(54) ELASTIC ENDLESS CRAWLER

(75) Inventor: Masaru Ishibashi, Setagaya-ku (JP)

(73) Assignee: Bridgestone Corporation, Tokyo (JP)

( * ) Notice: Subject to any disclaimer, the term of this patent is extended or adjusted under 35 U.S.C. 154(b) by 70 days.

(21) Appl. No.: 10/474,699

(22) PCT Filed: Apr. 12, 2002

(86) PCT No.: PCT/JP02/03669

§ 371 (c)(1),
(2), (4) Date: Oct. 14, 2003

(87) PCT Pub. No.: WO02/085692

PCT Pub. Date: Oct. 31, 2002

(65) Prior Publication Data

US 2004/0130212 A1    Jul. 8, 2004

(30) Foreign Application Priority Data

Apr. 16, 2001 (JP) ............................. 2001-116444
Jul. 13, 2001 (JP) ............................. 2001-214299

(51) Int. Cl.
*B62D 55/24* (2006.01)
*F16G 1/00* (2006.01)

(52) U.S. Cl. ...................... 305/167; 305/170

(58) Field of Classification Search ............. 305/165, 305/167, 169–177; 180/9.1, 9.5

See application file for complete search history.

(56) References Cited

U.S. PATENT DOCUMENTS

| | | | |
|---|---|---|---|
| 6,155,657 A * | 12/2000 | Erlich et al. | 305/178 |
| 6,290,009 B1 * | 9/2001 | Kondo et al. | 180/9.1 |
| 6,422,666 B1 * | 7/2002 | Choi | 305/178 |
| 6,520,603 B1 * | 2/2003 | Shimada et al. | 305/167 |

FOREIGN PATENT DOCUMENTS

| | | |
|---|---|---|
| EP | 0 919 455 A1 | 6/1999 |
| JP | 57-139491 | 8/1982 |
| JP | U 58-85577 | 6/1983 |
| JP | A 8-150969 | 6/1996 |
| JP | A 8-188184 | 7/1996 |
| JP | A 10-250650 | 9/1998 |
| JP | A 11-278325 | 10/1999 |
| WO | WO98/07613 | 2/1998 |

* cited by examiner

*Primary Examiner*—Russell D. Stormer
*Assistant Examiner*—Jason R. Bellinger
(74) *Attorney, Agent, or Firm*—Oliff & Berridge, PLC.

(57) ABSTRACT

An elastic endless crawler including an annular belt-shaped elastic crawler body, the crawler body includes a series of driven elements for operation of the crawler and a reference plane which passes through respective centers of the drive elements and extends in a longitudinal direction of the crawler, and a thickness of one side relative to the reference plane and a thickness of the other side relative to the reference plane are different from one another. The lengths between respective crawler body end surfaces facing in a crawler widthwise direction, and the reference lane are different from one another. A thickness of one side, which is shorter in length, of the crawler body is greater than that of the other side, which is longer in length, of the crawler body.

10 Claims, 6 Drawing Sheets

ELASTIC ENDLESS CRAWLER

TECHNICAL FIELD OF THE INVENTION

The present invention relates to an elastic endless crawler.

BACKGROUND ART

A rubber crawler, which is mounted on a motor vehicle such as an earth-moving vehicle, as shown in FIGS. 7 and 8, presents an endless belt shape. The illustrated rubber crawler 101 is basically formed of a crawler body 103 that is made of rubber. The rubber crawler 101 is entrained around a drive roller 105 and an idler roller 107. A plurality of take-up rollers 109 is disposed at an inner peripheral side of the rubber crawler 101.

A number of cores 111 are embedded in the crawler body 103 with predetermined spacing along a longitudinal direction of the rubber crawler. The cores 111 extend in a direction orthogonal to the rubber crawler longitudinal direction (i.e., a widthwise direction of the rubber crawler) and are disposed parallel with one another. A number of engagement holes 113 (sprocket holes) are formed in the crawler body and respectively disposed between two adjacent cores. Teeth of the drive roller (sprocket) engage with the engagement holes 113.

Projections 111A of the cores 111 protrude from the rubber crawler inner peripheral surface.

Cord layers are provided at posterior positions (at an outer peripheral side) on each side in the rubber crawler widthwise direction. Each cord layer is comprised of a plurality of steel cords C, each of which extends along the rubber crawler longitudinal direction and which are embedded parallel with one another.

A plurality of lugs 115 are regularly provided at predetermined pitches in the rubber crawler longitudinal direction, each lug extending from the outer peripheral surface of the rubber crawler 101. All the lugs are integrally formed with crawler body 103.

Such a conventional type rubber crawler generally has a shape or structure which is symmetrical in relation to the sprocket holes (a rubber crawler longitudinal center line). However, recently, a rubber crawler, which has an asymmetrical structure, has appeared. It is resulted from the fact that forming positions of sprocket holes are respectively shifted from widthwise direction center positions to one side due to an increase in crawler width based on the tendency of vehicles to become large. A thickness (rubber thickness) of a left side portion of a crawler body and a thickness (rubber thickness) of a right side portion of the crawler body are the same as in the conventional symmetrical type rubber crawler as described above.

In such an asymmetrical type rubber crawler, a body portion and lugs, which are located at a shorter side, with regard to a length between a sprocket hole center and a side end face, of a crawler body, are damaged more easily than those located at a longer side of the crawler body. In other words, there is a concern that a rubber-made crawler body portion located at a weakened side might be unilaterally damaged or worn out. It is considered that this is because the areas of left and right portions of a rubber crawler, to which portions loads are applied when the rubber crawler is being used, are different from each other, and accordingly, the surface pressure differs between the left and right portions.

With respect to this problem, a convenient solution is conceivable in which ground contacting areas at left and right portions of lugs are made approximately equal. However, difficulties are experienced in designing a rubber crawler having such a structure.

Thus, it is generally said that asymmetrical type rubber crawlers have a short life.

DISCLOSURE OF THE INVENTION

In light of the above-described problems, according to one aspect, there is to provide an improved crawler having excellent durability and reliability or having a long life, in which a substantial difference in strength between one side in a widthwise direction (a left and right direction) of an asymmetrical type elastic endless crawler and the other side in the widthwise direction of the crawler can be eliminated or both of the sides of the crawler can have the same level of strength.

In order to solve the above-described problems, according to one aspect, there is provided an elastic endless crawler having an annular belt-shaped elastic crawler body. The crawler body includes a series of driven elements for operation of the crawler and a reference plane, which reference plane passes through respective centers of the driven elements and extends in a longitudinal direction of the crawler and a thickness of one width side of the crawler body relative to the reference plane and a thickness of the other width side of the crawler body relative to the reference plane are different from one another.

BEST MODE FOR CARRYING OUT THE INVENTION

Figure 1:
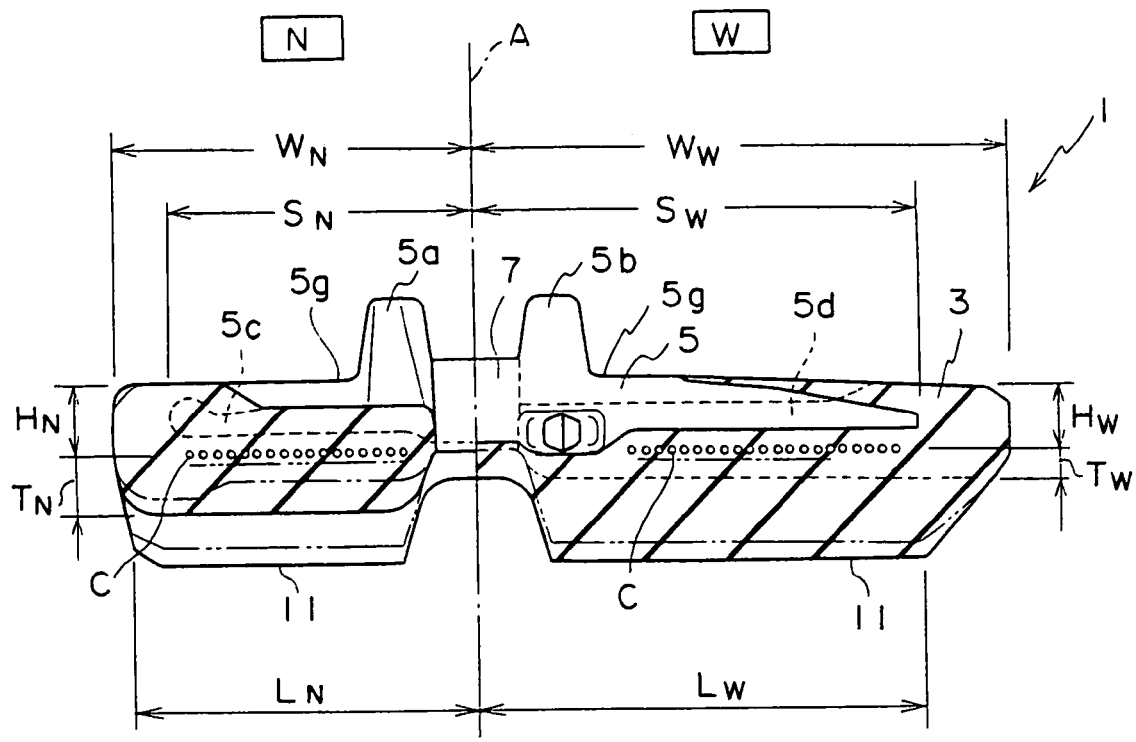
FIG. 1 is a sectional view transversely of the length of a rubber crawler according to an embodiment of the present invention.
Figure 2:
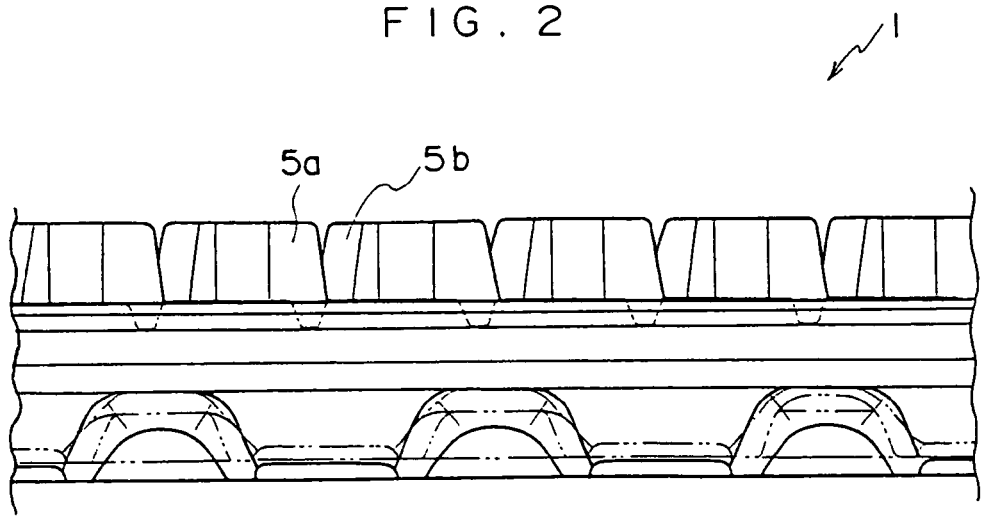
FIG. 2 is a side view of the rubber crawler.
Figure 3:
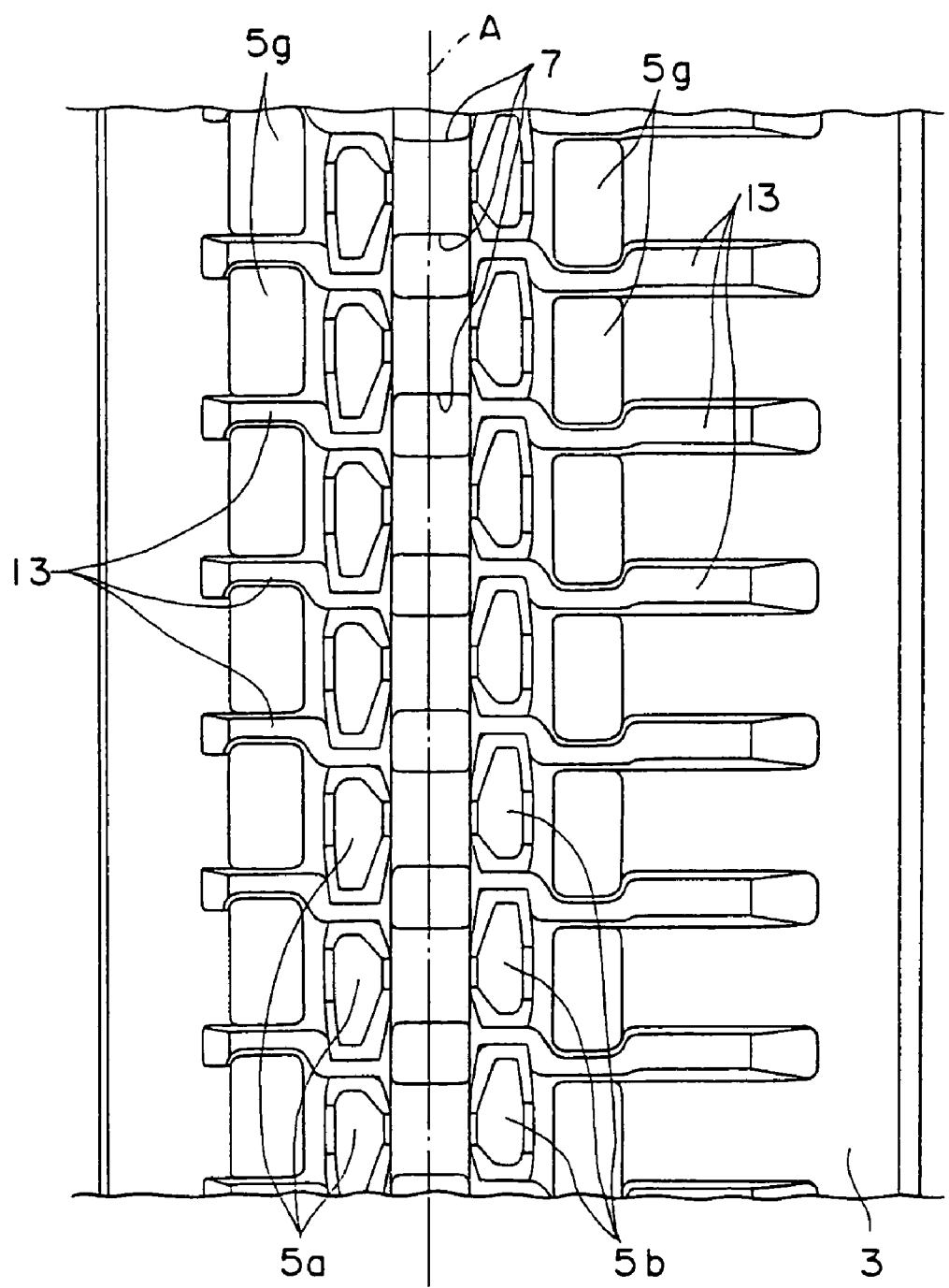
FIG. 3 is a view of the rubber crawler as seen from an inner peripheral side thereof.
Figure 4:
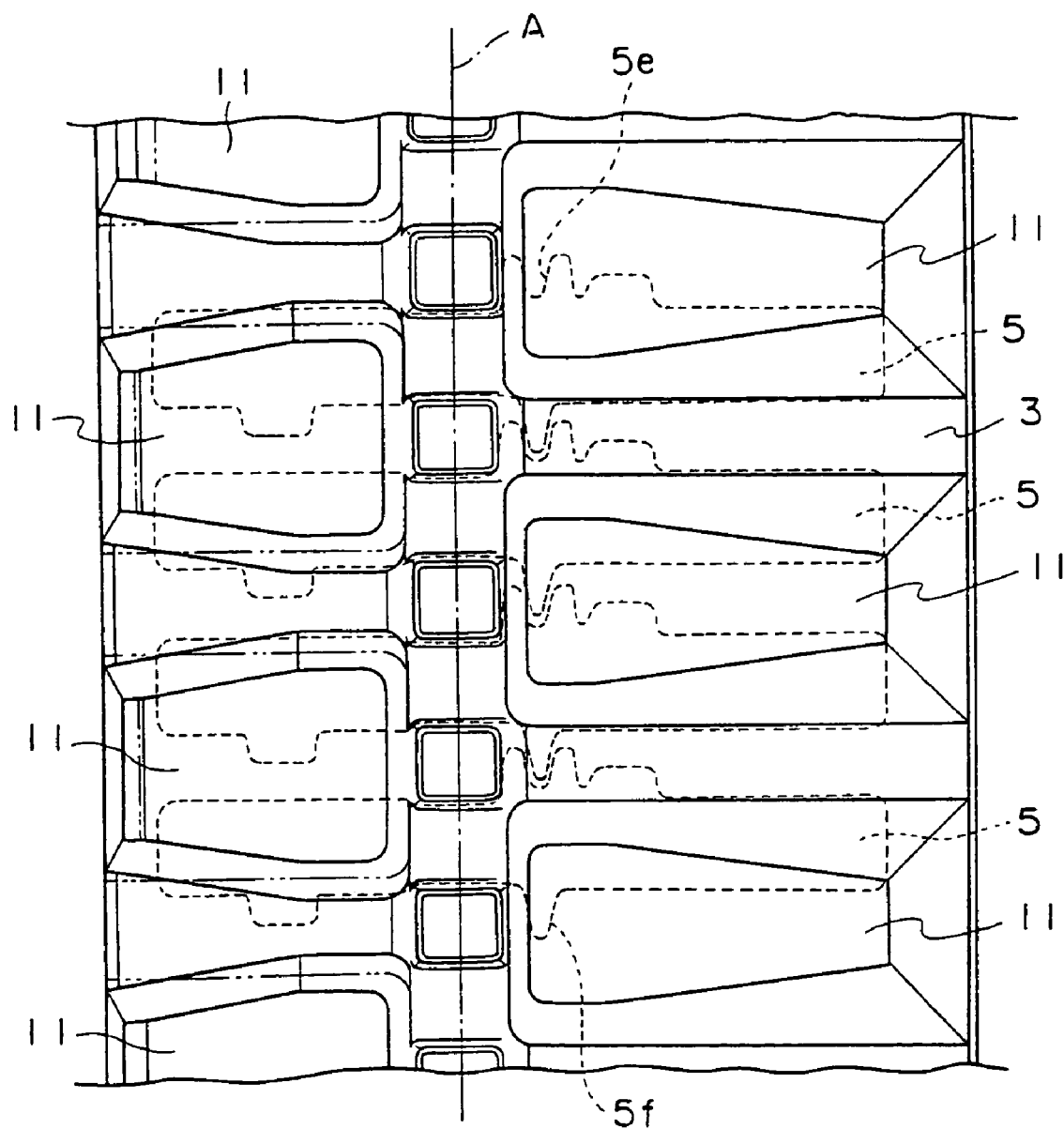
FIG. 4 is a view of the rubber crawler as seen from an outer peripheral side thereof.
Figure 4:

An embodiment of the invention will be hereinafter described with reference to FIGS. 1 to 4. However, the present invention is not limited thereto.

An illustrated rubber crawler 1 presents an endless belt form and includes a crawler body 3 that is made of rubber. A plurality of steel cores 5 are embedded in the crawler body 3 with predetermined intervals (or pitches) along a longitudinal direction of the rubber crawler. The cores 5 extend individually in a direction orthogonal to the rubber crawler longitudinal direction (i.e., a widthwise direction of the rubber crawler) and are disposed parallel with one another. Engagement holes 7 (or sprocket holes) are formed in the crawler body and respectively disposed between two adjacent cores.

A plurality of lugs 11 are regularly provided in a protruding manner at an outer peripheral surface of the rubber crawler with predetermined intervals along the rubber crawler longitudinal direction. The lugs 11 are integrally formed with the crawler body 3. These lugs 11 can be divided by a reference plane A as a boundary into two groups of lugs 11: one group of lugs on the right side in FIG. 4 and the other group of lugs on the left side in the same figure. The lugs 11 of the right side lug group and the lugs 11 of the left side lug group are different from one another in size and shape and are disposed in an offset manner with respect to the rubber crawler longitudinal direction. In other words, the lugs 11 are generally disposed in a staggered manner. The intent of this disposition is to reduce generation of vibration or noise. Incidentally, the lugs 11 are not limited to the illustrated shapes and may have any appropriate shapes.

Here, a surface, which passes through each center of the engagement holes 7 and extends in the rubber crawler longitudinal direction, is defined as the reference plane A. One side with respect to the reference plane A, for example, in the illustrated embodiment the right side including longer part of the crawler body, is denoted by W and the other side, i.e., the left side including shorter part of the crawler body, is denoted by N (refer to FIG. 1).

Each of the cores 5 is arranged approximately in point symmetrical relation with respect to a center between the engagement holes 7 on both sides thereof and has two raised portions (bosses) 5a and 5b, which protrude from an inner peripheral surface of the rubber crawler, and wing portions 5c and 5d, which extend to respective sides, i.e., left (N) side and right (W) side, respectively. Fitting portions (i.e., a fitting concave portion 5e and a fitting convex portion 5f) are provided one at each side of each of the cores 5, for an interconnection with adjacent cores.

A dimension $S_W$ between the reference plane A and the end face of the right side wing portion 5d is greater than a dimension $S_N$ between the reference plane A and the end face of the left side wing portion 5c ($S_W > S_N$). Similarly, a dimension $W_W$ between the reference plane A and the right end of the crawler body is greater than a dimension $W_N$ between the reference plane A and the left end of the crawler body ($W_W > W_N$).

The left side wing portion 5c and the right side wing portion 5d of each of the cores 5 include tracker roller travelling portions (travelling surfaces) 5g of rectangular shape, which are exposed to the inner peripheral side of the rubber crawler and which are substantially coplanar with the inner peripheral surface of the rubber crawler.

Grooves 13 are formed at the rubber crawler inner peripheral portion between each of two adjacent cores in order to reduce a winding resistance when the rubber crawler is being wound. Each groove 13 is formed until the vicinity of the tracker roller travelling portion 5g. However, it may be formed until the edge of the rubber crawler widthwise directional end.

As can be seen from FIG. 1, cord layers are formed and positioned behind or beneath the respective cores 5 (at the rubber crawler outer peripheral side), more specifically, behind or beneath the left side wing portions 5c and the right side wing portions 5d. Each of the cord layers includes a plurality of steel cords C, each of which extends along the rubber crawler longitudinal direction and which are embedded parallel with one another.

A dimension $H_N$ between a cord center of one cord group and the rubber crawler inner peripheral surface and a dimension $H_W$ between a cord center of the other cord group and the rubber crawler inner peripheral surface are substantially the same ($H_N \approx H_W$). However, a dimension $T_N$ between the cord center of the one cord group and the rubber crawler outer peripheral surface and a dimension $T_W$ between the cord center of the other cord group and the rubber crawler outer peripheral surface are different from each other ($T_N \neq T_W$, $T_N > T_W$, or $(H_N + T_N) \neq (H_W + T_W)$).

The present inventor conducted a wide variety of experiments in connection with relations between $T_N$ and $T_W$ to accomplish the end desired. Finally, he has found that it is possible to obtain the desired effect by determining dimensions of rubber crawler components such that at least one of the following three formula is satisfied or achieved.

$$T_N/T_W \leq (W_W + W_N)^{0.5}/W_W^{0.5} \quad (1)$$

$$T_N/T_W \leq (S_W + S_N)^{0.5}/S_W^{0.5} \quad (2)$$

$$T_N/T_W \leq (L_W + L_N)^{0.5}/L_W^{0.5} \quad (3)$$

wherein $T_N$=a length dimension between the cord center at the N side and the rubber crawler outer peripheral surface;

$T_W$=a length dimension between the cord center at the W side and the rubber crawler outer peripheral surface;

$W_W$=a length dimension between the reference plane A and the W side end surface of the crawler body;

$W_N$=a length dimension between the reference plane A and the N side end surface of the crawler body;

$S_W$=a length dimension between the reference plane A and the W side core end surface;

$S_N$=a length dimension between the reference plane A and the N side core end surface;

$L_W$=a length dimension between the reference plane A and the W side lug edge; and $L_N$=a length dimension between the reference plane A and the N side lug edge.

$T_N$ and $T_W$, which can be calculated from the above formula, should be determined such that a difference therebetween is approximately 2 to 15 mm. That is, in a case in which this difference is over 15 mm, a great difference in height between left and right lugs of a rubber crawler may exist, and therefore, this may have a deleterious effect on a driving force of a vehicle in which the rubber crawler is mounted. On the other hand, in a case in which the above difference is below 2 mm, there is a concern that it is not possible to accomplish the end desired.

Lastly, brief description will be given of an endurance test, which was carried out in order to verify a performance of a rubber crawler according to the present invention.

A rubber crawler (example) in which $T_N - T_W = 10$ mm and a rubber crawler (comparative example) in which $T_N = T_W$ were used in an experiment. In both of the rubber crawlers, each lug has a hardness of approximately 70 degrees and an elongation of 400% or more, and each body portion (rubber portion) on an inner peripheral side (tracker roller side) has a hardness of approximately 74 degrees and an elongation of 200% or more.

In the experiment, test vehicles in which respective rubber crawlers were mounted were prepared and driven under the following travelling conditions. Thereafter, the rubber crawlers were inspected for an external appearance.

The experimental travelling conditions were such that each of the test vehicles was driven for 50 hours or through 5 cycles, wherein, in one cycle, the vehicle was driven for 8 hours on a rough road in a zigzag driving manner, for 1 hour on a metaled road in a zigzag driving manner, for fifteen minutes on a cobbled road in a figure-of-eight driving manner, and for forty-five minutes on a concrete road in a zigzag driving manner.

Figure 5:
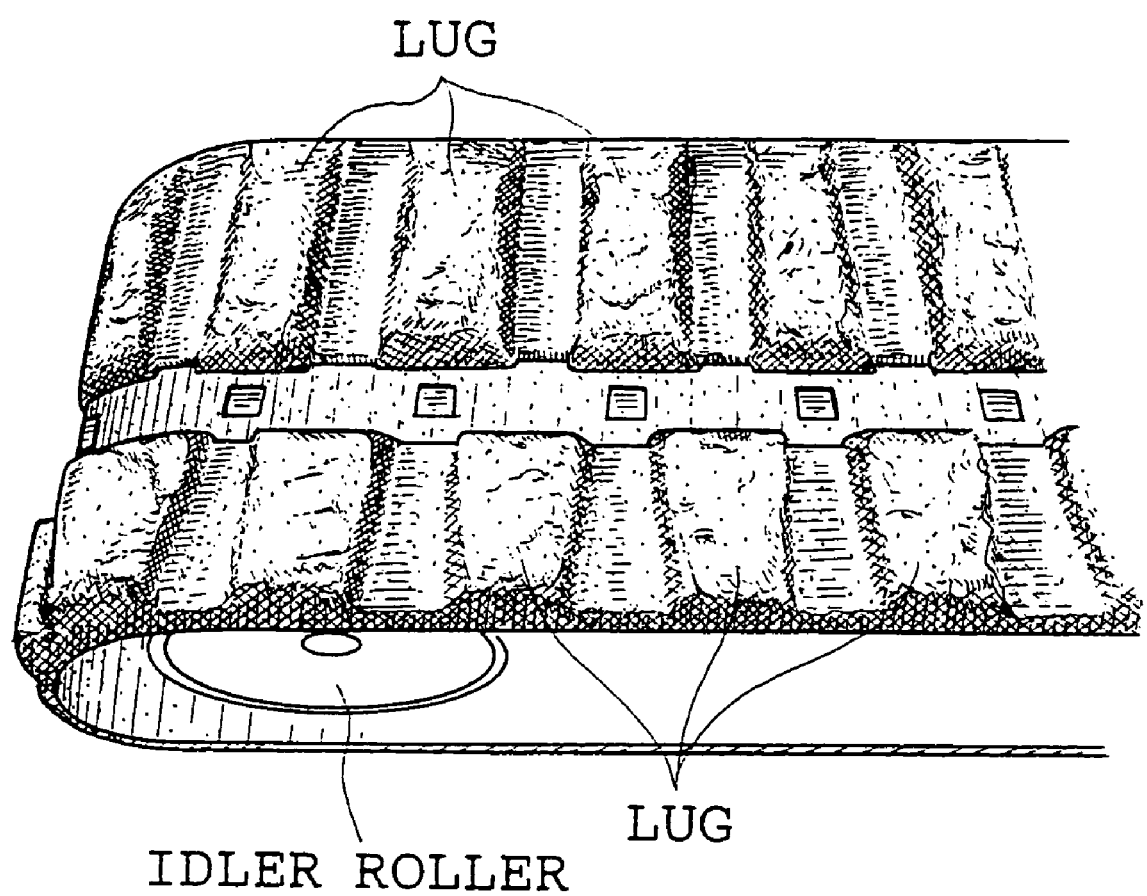
FIG. 5 is a copy of an external appearance of an example of a rubber crawler after an endurance test has been performed.

As can be seen from FIG. 5 which is a copy of an external appearance of the example of the rubber crawler after the travelling, although wear has resulted in surfaces of lugs, it is not excessive, and there is almost no serious or major crack. Serious cracks did not occur in crawler body surface portions each between two adjacent lugs.

Figure 6:
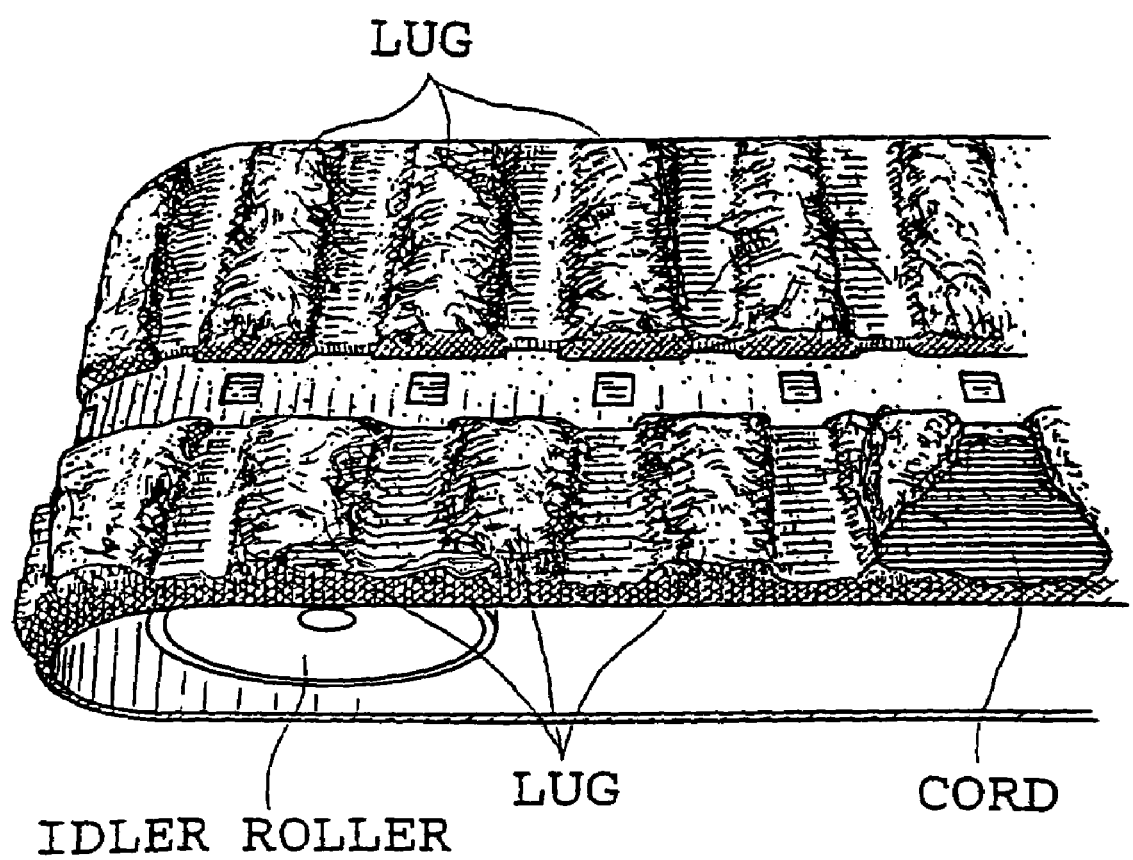
FIG. 6 is a copy of an external appearance of a comparative example of a rubber crawler after the endurance test performed.
Figure 7:
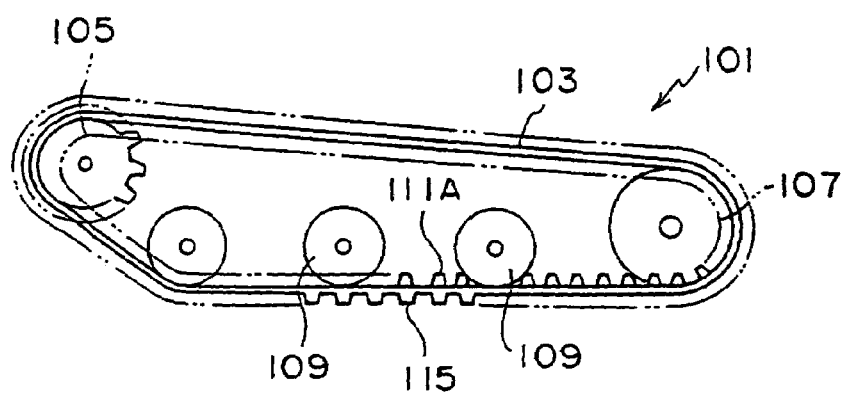
FIG. 7 is a side view showing a conventional rubber crawler currently in use.
Figure 8:
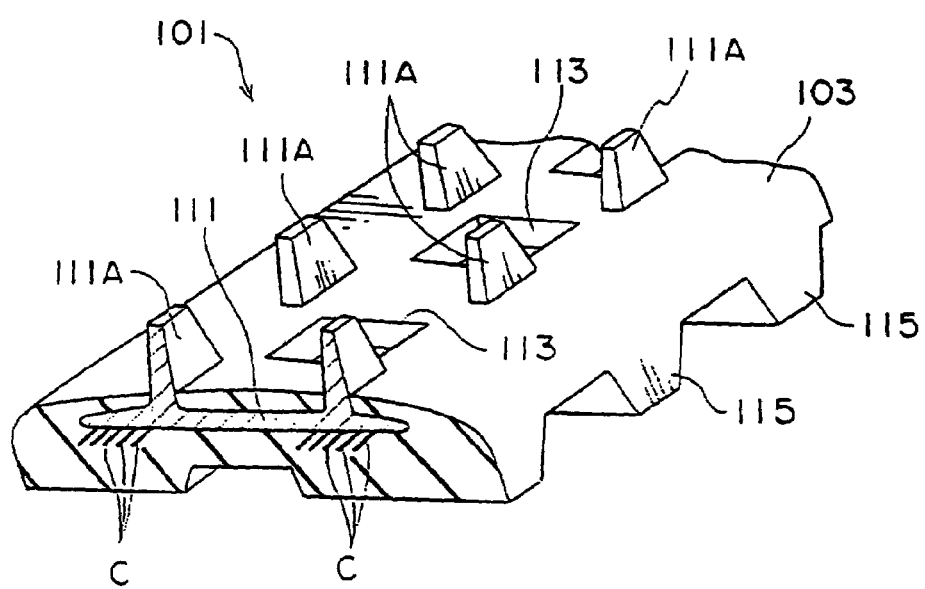
FIG. 8 is a partly-broken, perspective view of a conventional rubber crawler.

On the other hand, as can be seen from FIG. 6 which is a copy of an external appearance of the comparative example of the rubber crawler after the travelling, considerable wear has resulted in surfaces of lugs. The shapes of the lugs have been substantially deformed and some lugs have been partly fractured. Further, there are portions where cord layers, which must have been embedded within the crawler body, are partly subjected outside.

Additionally, during the experimental travelling, the number of occurrences of running off of the rubber crawler (the example) was zero, whereas the number of occurrences of running off of the rubber crawler (comparative example) was six.

INDUSTRIAL APPLICABILITY

As described above, according to the present invention, it is possible to effectively avoid or reduce a potential disadvantage that one side in a widthwise direction of an asymmetrical rubber crawler is easily damaged. As a result, a long life rubber crawler that is low-priced and superior in durability and reliability can be placed on the market within a short period of time.

The invention claimed is:

1. An elastic endless crawler, comprising: an annular belt-shaped elastic crawler body, wherein:
   the crawler body comprises an outer peripheral surface, at least one cord defining at least one cord group, a series of driven elements for operation of the crawler, and a reference plane defining a surface passing through respective centers of the series of driven elements and extending in a longitudinal direction of the crawler; and
   a thickness of one width side of the crawler body relative to the reference plane and a thickness of the other width side of the crawler body relative to the reference plane are different from one another, wherein the thickness is a dimension between a cord center of the cord group and the outer peripheral surface of the crawler body.

2. The elastic endless crawler of claim 1, wherein lengths between respective crawler body side surfaces facing in a crawler widthwise direction and the reference plane are different from one another.

3. The elastic endless crawler of claim 2, wherein the thickness of one width side of the crawler body, having a small width, is greater than the thickness of the other width side of the crawler body, having a larger width.

4. The elastic endless crawler of claim 1, wherein the plurality of cords for reinforcement are embedded at respective left and right sides relative to the reference plane in the crawler body such that the cords extend in the crawler longitudinal direction and are spaced apart along the crawler widthwise direction with a predetermined spacing.

5. The elastic endless crawler of claim 4, wherein lengths between respective crawler end surfaces in a crawler widthwise direction and the reference plane are different from one another and wherein when one width side, having a small width, is referred to as a N side and the other width side, having a larger width, is referred to as a W side and when
   a length dimension between a cord center at the N side and the outer peripheral surface of the crawler body is $T_N$,
   a length dimension between a cord center at the W side and the outer peripheral surface of the crawler body is $T_w$,
   a length dimension between the reference plane and the N side crawler body end surface is $W_N$, and
   a length dimension between the reference plane and the W side crawler body end surface is $W_w$, $$T_N/T_w \leq (W_w+W_N)^{0.5}/W_w^{0.5}.$$

6. The elastic endless crawler of claim 4, wherein a plurality of cores are embedded in the crawler body with predetermined intervals along the crawler longitudinal direction such that the cores extend individually in the crawler widthwise direction, which is orthogonal to the crawler longitudinal direction, and are disposed parallel with one another.

7. The elastic endless crawler of claim 6, wherein the series of driven elements comprise sprocket engaging holes, each of which is formed in the crawler body and disposed between two adjacent cores.

8. The elastic endless crawler of claim 6, wherein lengths between respective crawler end surfaces in a crawler widthwise direction and the reference plane are different from one another and wherein when one width side, having a small width, is referred to as a N side and the other width side, having a larger width, is referred to as a W side and when
   a length dimension between a cord center at the N side and the outer peripheral surface of the crawler body is $T_N$,
   a length dimension between a cord center at the W side and the outer peripheral surface of the crawler body is $T_w$,
   a length dimension between the reference plane and a core end surface at the N side is $S_N$, and
   a length dimension between the reference plane and a core end surface at the W side is $S_w$, $$T_N/T_W \leq (S_W+S_N)^{0.5}/S_W^{0.5}.$$

9. The elastic endless crawler of claim 4, wherein a plurality of lugs are regularly provided in a protruding manner at the outer peripheral surface of the crawler body with predetermined intervals along the rubber crawler longitudinal direction.

10. The elastic endless crawler of claim 9, wherein lengths between respective crawler end surfaces in a crawler widthwise direction and the reference plane are different from one another and wherein when one width side, having a small width, is referred to as a N side and the other width side, having a larger width, is referred to as a W side and when
   a length dimension between a cord center at the N side and the outer peripheral surface of the crawler body is $T_N$,
   a length dimension between a cord center at the W side and the outer peripheral surface of the crawler body is $T_W$,
   a length dimension between the reference plane and a lug edge at the N side is $L_N$, and
   a length dimension between the reference plane and a lug edge at the W side is $L_W$, $$T_N/T_W \leq (L_W+L_N)^{0.5}/L_W^{0.5}.$$

* * * * *